Patented June 24, 1952

2,601,251

UNITED STATES PATENT OFFICE 2,601,251

ACRYLONITRILE POLYMERS

Herman A. Bruson, Shaker Heights, Ohio, assignor to Industrial Rayon Corporation, Cleveland, Ohio, a corporation of Delaware No Drawing. Application October 8, 1948, Serial No. 53,587

11 Claims. (Cl. 260—85.5)

This invention relates to the preparation of polymeric materials and to the shaped articles formed therefrom. More particularly, this invention is concerned with the polymerization products of a polymerizable mixture comprising a major proportion of acrylonitrile and a minor proportion of a mono-vinyl ether of an amino-alcohol or a salt thereof, in the presence or absence of other mono-ethylenic compounds, which polymerization products are particularly adapted to dyeing. This invention also deals with compositions of these copolymers adapted to the formation of shaped articles and with processes for the conversion of these compositions to molecularly oriented fibers, threads, bristles, mono-filaments and other shaped articles such as films and the like, which articles show improved dyeing properties.

Generally, it has been known in the prior art, that certain polymers and copolymers of acrylonitrile may be adapted to the preparation of shaped articles such as films, fibers, bristles, etc. For the preparation of molecularly oriented structures such as fibers, filaments or threads, copolymers of acrylonitrile having high percentages of acrylonitrile in the polymer molecule; e. g., about 85% or more, have been regarded as desirable because of their higher softening points, thermal stability and tensile strength. For some time the use of certain nitrogenous and sulfur-containing solvents having toxic properties was known. Recently, however, more appropriate non-toxic solvents, notably ethylene carbonate and propylene carbonate, have been suggested for use in preparing solutions and dispersions of polymers and copolymers containing at least about 80% acrylonitrile in the polymer molecule. By the use of these very effective solvents, molecularly oriented structures may readily be prepared from acrylonitrile polymers and copolymers.

There is, however, a problem regarding the dyeing properties of polymers containing high percentages of acrylonitrile with or without other polymerizable compounds. It appears that these polymers generally are difficult to dye in aqueous dye baths with many of the ordinary water-soluble dyestuffs by the usual methods employed in the textile industry, because they are not easily penetrated by the dye solution. For example, U. S. Patent 2,431,956 issued to F. B. Moody, illustrates this difficulty of dyeing acrylonitrile fibers containing at least 85%, by weight, of acrylonitrile.

Attempts to reduce or eliminate this difficulty have been made by incorporating in the acrylonitrile prior to polymerization, certain amides such as acrylamide or methacrylamide, or nitrogenous esters such as N-dimethaminoethyl acrylate, so as to obtain mixed polymers or mixtures of copolymers which might be more easily dyed. In general, however, the results have not been entirely satisfactory since either the shrinking, softening or "sticking" point of the fiber has been adversely affected or the dye uptake by the fiber has been mediocre or spotty. Furthermore, on exposure to weathering, sunlight, or repeated launderings with soap and water, most of the dyed fibers have either faded or shown a leaching out or release of the dyestuff from the polymer.

It has now been found that copolymer compositions of acrylonitrile and mono-vinyl ethers of amino-alcohols or salts thereof, may be prepared, which compositions are particularly adapted to dyeing and to the formation of molecularly oriented shaped articles. Such articles may be produced in accordance with this invention by dissolving the coploymer in a suitable solvent, coagulating the copolymer into a shaped article and thereafter subjecting the article to such further treatment, e. g., cold drawing, thermal stretching, heat treating, dyeing, finishing, etc., as may be necessary to give the article the desired properties.

According to this invention, new polymers are prepared by polymerizing a mixture of copolymerizable monoethylenic compounds comprising acrylonitrile and a mono-vinyl ether of an amino-alcohol or a salt thereof. Suitable mono-vinyl ethers of amino-alcohols which are capable of being copolymerized with acrylonitrile to give filaments that can be stretched to give useful fibers of high-tensile strength and which can be easily dyed by most of the known acid dyestuffs in a manner analogous to wool dyeing are those derived from primary, secondary or tertiary amino-alcohols. These ethers may possess more than one amino or hydroxyl group and may be aliphatic, aromatic, arylaliphatic, cycloaliphatic, or heterocyclic in character. The ethers of this invention have the formula

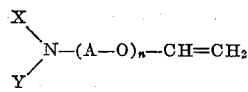

wherein A is an alkylene group, $n$ is an integral number, and wherein X and Y taken singly are members of the group consisting of hydrogen, alkyl, hydroxyalkyl, alkoxyalkyl, aminoalkyl, cyanoalkyl, cycloalkyl, aralkyl, furfuryl, pyridyl, aryl and aminoaryl radicals; and X and Y taken jointly form a saturated heterocyclic radical. X, Y and A can possess up to eighteen or more carbon atoms and can be interrupted by oxygen or nitrogen atoms.

Typical amino-mono-vinyl ethers useful for the purpose of this invention are mono-vinyl ethers of aliphatic-amino-alcohols such as, for example, the following:

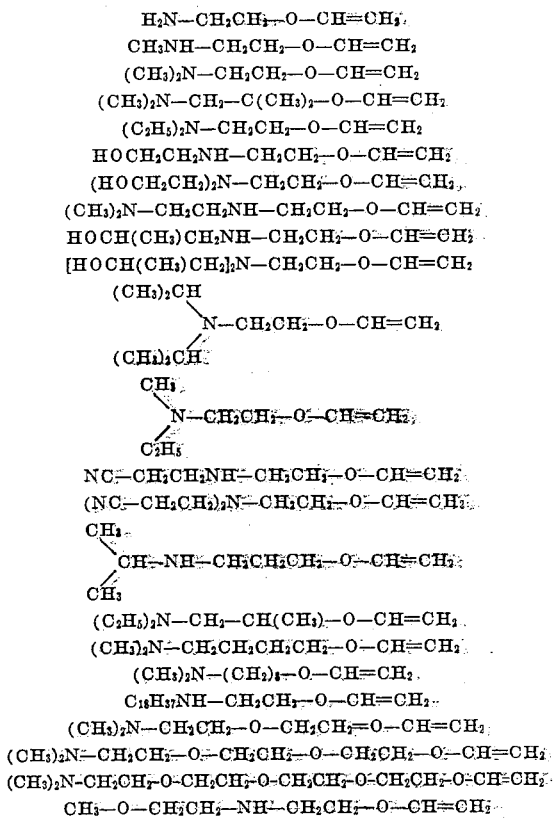

Other typical amino-mono-vinyl ethers suitable for use in the practice of this invention are, for example, the following:

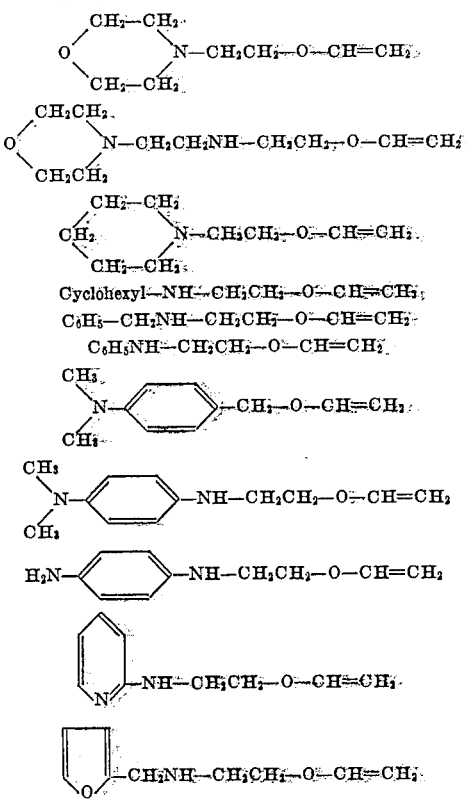

These ethers are obtainable by reacting the corresponding amino-alcohols with acetylene, or by reacting vinyl chloro-aliphatic ethers with ammonia or primary or secondary amines in the presence of alkalies.

The amount of the amino-mono-vinyl ether desirable in the polymer varies inversely with the basic nitrogen content of the former; the greater its basic nitrogen content, the smaller the amount of the ether required. About 10% or less of the amino-mono-vinyl ether based on the total weight of monomers used, is sufficient to give improved dyeing properties with acid dyes, even amounts of from about 0.75% to 2% of the lower molecular weight amino-mono-vinyl ethers such as $H_2NCH_2CH_2$—O—CH=CH$_2$ and $$(CH_3)_2N-CH_2CH_2-O-CH=CH_2$$

being effective in this respect.

In place of the free bases one can use the water-soluble salts of the amino-mono-vinyl ethers with inorganic or organic acids. Typical of these are the salts with hydrochloric, sulfuric, phosphoric, nitric, or boric acids or the salts of organic mono- or polycarboxylic acids of the aliphatic, aromatic, aryl-aliphatic, cycloaliphatic or heterocyclic series typical of which are formic, acetic, propionic, chloracetic, acrylic, methacrylic, crotonic, oleic, lauric, stearic, glycolic, lactic, benzoic, phenylacetic, phthalic, naphthenic, furoic, maleic, fumaric, itaconic, citraconic, oxalic, succinic, adipic, sebacic acids, etc.

Shaped articles may be formed from solutions of the above mentioned copolymers by extruding the solutions into suitable coagulating media. If desired coagulating baths comprising essentially water or coagulating baths comprising a water-soluble, aliphatic, hydroxy-containing compound may be used with advantage. Filamentary materials produced by such methods may be oriented to form fibers having high tenacity, high elastic recovery, low shrinkage, etc.

This invention will be more fully described by the following examples which illustrate the use of an amino-mono-vinyl ether or a salt thereof, to enhance the dyeing properties of the acrylonitrile polymers. It is understood that the invention is not intended to be limited by these examples. Throughout this application "parts" and "percent" of materials is intended to mean parts and percent by weight.

EXAMPLE I

A mixture of 95 parts of acrylonitrile and 5 parts of beta-morpholino-ethyl vinyl ether was added gradually during the course of one hour to a stirred solution of 500 parts water, 1.3 parts of ammonium persulfate, 2.7 parts sodium bisulfite and 5 parts of emulsifier "Triton 720" [a 30% solution of

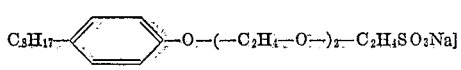

under an atmosphere of nitrogen. The temperature was maintained at 57–60° C. during the addition and for three hours thereafter. Distilled water (300 parts) was added to thin the mixture and the white copolymer was filtered off, washed thoroughly with warm water and dried for eighteen hours in an oven at 75–80° C. The yield of copolymer was 82 parts. It is readily soluble at 115° C. in gamma-valerolactone to give a 10% solution; whereas a polymer of acrylonitrile alone made under the same conditions but without the beta-morpholinoethyl vinyl ether was found to be insoluble in gamma-valerolactone at the same temperature and concentration. This indicates that the product is a true copolymer of acrylonitrile and beta-morpholinoethyl vinyl ether.

A 10 solution of this copolymer (average molecular weight 95,000) was prepared in ethylene carbonate as a solvent and the solution poured upon a clean glass plate. The plate was placed in an electrically heated oven and the solvent was evaporated off in a current of air at 110° C. The film obtained was clear and colorless. It was stripped off from the glass by soaking in water, and air dried. Narrow strips of this film were drawn over a metal edge heated to 110° C., to ten times their original length, thus forming molecularly oriented threads of high tenacity. Filaments or films thus prepared were dyed a deep fast green by boiling them for fifteen minutes in a dye bath containing 2% of sulfuric acid and 0.1% of the dyestuff known as Fast Acid Green B (Color Index No. 667).

The dyed filaments and films thus obtained were then washed and finally boiled with soapy water to remove any unabsorbed dye. They were then air dried. The dry films and filaments were found to be evenly dyed a deep green completely through and were fast to repeated laundering.

In contrast to the above, the polymer of acrylonitrile alone, or copolymers of acrylonitrile (95%) with vinyl chloride, vinyl acetate, methyl acrylate, acrylamide, methacrylamide, vinylidene chloride, styrene, or vinyl butyl ether (5%) made under the same conditions but without the beta-morpholinoethyl ether gave films which could not be dyed with Fast Acid Green B nor with other commonly used acid dyestuffs under the same conditions.

In place of the beta-morpholinoethyl vinyl ether, one can use beta-dimethylaminoethyl vinyl ether, beta-diethylaminoethyl vinyl ether, beta-mono- or diisopropylaminoethyl vinyl ether, beta-aminoethyl vinyl ether or beta-piperidinoethyl vinyl ether, and obtain white powdery copolymers similar in character to the acrylonitrile-beta-morpholinoethyl vinyl ether copolymer.

The following method for preparing beta-morpoholinoethyl vinyl ether may be considered a general method for preparing these amino-mono-vinyl ethers.

*Preparation of beta-morpholinoethyl vinyl ether*

A mixture of 106 parts vinyl-2-chloroethyl ether (1 mole), 100 parts of morpholine (1.25 mole), 40 parts of sodium hydroxide (1 mole) and 320 parts of water was boiled under reflux with good stirring for ten hours. On cooling two layers formed. The oily upper layer was separated and distilled under reduced pressure. The pure product having the formula

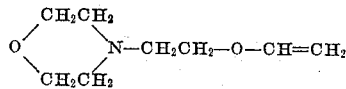

was a colorless liquid boiling at 114–115° C. (35 mm.) Yield 60 parts. An additional quantity can be extracted from the lower aqueous layer by means of benzene.

EXAMPLE II

A mixture of 80 parts ethylene carbonate, 38 parts of acrylonitrile, 2 parts of beta-diethylaminoethyl vinyl ether $(C_2H_5)_2N-CH_2CH_2-O-CH=CH_2$ and 0.20 part benzoyl peroxide was heated under nitrogen for twenty-four hours at 55–60° C. A clear viscous syrup of copolymer was obtained. Films and fibers were prepared from this copolymer by diluting with ethylene carbonate and evaporating the solvent in the usual manner. They could readily be dyed with acid dyes such as Fast Acid Green B, Wool Orange 3G, Quinoline Yellow, Alizarine Light Blue B, Tartrazine C, Acid Black 10BN and other acid dyes by the procedure described in Example I.

EXAMPLE III

A series of twelve copolymers of acrylonitrile and beta-piperidinoethyl vinyl ether were prepared as described in Example I, containing from 1% to 12%, by weight, of beta-piperidinoethyl vinyl ether in the monomer mixture, in 1% increments. The average molecular weight of these twelve copolymers varied from about 40,000 to about 150,000. Each of these copolymers was dissolved in ethylene carbonate and the solutions cast into thin films. Ribbons and fibers were prepared from these films by hot stretching at 140° C. It was found that appreciable dyeing of these fibers with acid dyes occurred when the proportion of beta-piperidinoethyl vinyl ether used was about 2% or more. As the proportion of beta-piperidinoethyl vinyl ether increased, the depth of dyeing of the copolymer with acid dyes such as Fast Acid Green B, Wool Orange 3G, Quinoline Yellow, Alizarine Light Blue B, etc., likewise increased, but the heat sensitivity of the films, ribbons and fibers prepared from these copolymers progressively decreased.

Copolymers of acrylonitrile and beta-piperidinoethyl vinyl ether prepared from mixtures containing more than 10% of the latter were too deficient in heat resistance to be considered valuable for preparing fibers of high quality, but may be used for films or coatings.

The most desirable fiber-forming copolymers from the point of view of dye receptivity and dye retention as well as resistance to heat, were those made from about 3% to about 7%, by weight, of beta-piperidinoethyl vinyl ether and correspondingly from about 97% to 93% of acrylonitrile.

The piperidinoethyl vinyl ether used above was prepared by boiling 106 parts of piperdine, 106 parts of 2-chloroethyl vinyl ether, 40 parts of sodium hydroxide and 320 parts of water for ten hours with rapid stirring under reflux. It is a colorless liquid boiling at 108° C. (50 mm.) Yield 125 parts.

EXAMPLE IV

A series of seven copolymers were prepared each from 95 parts of acrylonitrile and 5 parts of each of the following amino-aliphatic vinyl ethers:

(a) 

(b) $(CH_3)_2N-CH_2CH_2NH-CH_2CH_2-O-CH=CH_2$ (c) $(NC-CH_2CH_2)_2N-CH_2CH_2-O-CH=CH_3$ (d) $(CH_3)_2N-CH_2CH_2-O-CH_2CH_2-O-CH=CH_2$ (e) $C_6H_5NH-CH_2CH_2-O-CH=CH_2$ (f) $C_6H_5CH_2NH-CH_2CH_2-O-CH=CH_2$ (g) $(CH_3)_2N-CH_2CH_2-O-CH=CH_2$

Each mixture was stirred with 300 parts of distilled water, 1 part of ammonium persulfate and 2 parts of sodium bisulfite under an atmosphere of nitrogen. The temperature was maintained at 45–55° C. for twelve hours during the polymerization. The resulting copolymers were each diluted with water and then filtered off, washed and dried at 80° C. The white powdery copolymers possessed average molecular weights from about 60,000 to 130,000.

Films and fibers were prepared from these copolymers by dissolving them in ethylene carbonate or propylene carbonate and evaporating the solvent. They could readily be dyed with the commonly used acid dyes.

In a similar manner, the other amino-monovinyl ethers as set forth herein can be used to yield acrylonitrile copolymers that possess an enhanced affinity for acid or wool dyes.

The products of this invention are not limited to the modification of polyacrylonitrile, but can also be used to improve the dyeing characteristics of various acrylonitrile copolymers containing minor quantities (up to 10%) of vinyl, vinylidene, or other mono-ethylenic copolymerizable compounds, typical examples of which are vinyl chloride, vinyl fluoride, vinylidene chloride, vinylidene fluoride, methacrylonitrile, fumaro-dinitrile, acrylamide, methacrylamide, vinyl acetate or other vinyl esters, isopropenyl acetate, vinyl ethyl ether or other vinyl alkyl ethers, styrene, vinyl ketones, acrylic acid, itaconic acid, citraconic acid, maleic acid, fumaric aid and methacrylic acid or their esters. The presence of amino-mono-vinyl ethers in the polymer molecule of such copolymers imparts similar improvement in dyeing characteristics as is evident in the copolymers of the above examples.

A typical example of such a dye receptive tripolymer system having solubility in nitromethane and capable of being dry spun from a spinneret into a current of heated air is a copolymer containing acrylonitrile, isopropenyl acetate and beta-piperidinoethyl vinyl ether, which may be prepared as follows:

A mixture of 88 parts of acrylonitrile, 8 parts of isopropenyl acetate and 4 parts of beta-piperidinoethyl vinyl ether

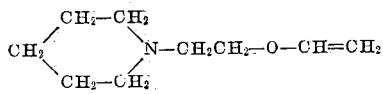

was added dropwise to a stirred solution of 500 parts distilled water, 2.7 parts ammonium persulfate, 1.3 parts of sodium bisulfite and 5 parts of "Triton 720" emulsifier under an atmosphere of nitrogen at 55–60° C. After the addition, the mixture was stirred and heated six hours longer at 60° C., then filtered, washed and dried. A 15% solution of this tripolymer in nitromethane was prepared and spun into a current of heated air from a 40 hole spinneret to give a filament capable of being heat-stretched and heat-treated to produce a desirable fiber that is readily dyed with acid dyes in an acid solution.

EXAMPLE V

Morpholinoethyl vinyl ether hydrochloride was prepared by adding 4.06 parts beta-morpholinoethyl vinyl ether to 2.6 parts concentrated hydrochloric acid in 50 parts of water. The resulting hydrochloride was then mixed with a solution of 450 parts of water, 1.3 parts ammonium persulfate, 2.7 parts of sodium bisulfite, 5 parts of emulsifier "Triton 720" and 95 parts of acrylonitrile, and stirred rapidly while maintaining the reaction temperature at 45–50° C. for six hours. The white powdery copolymer was filtered off, washed and dried at 80° C. Yield 94 parts. Films and fibers prepared therefrom were readily dyed in 2% sulfuric acid with Orange Y.

EXAMPLE VI

A mixture of 81 parts of beta-morpholinoethylamine, 53 parts of 2-chloroethyl vinyl ether, 20 parts sodium hydroxide and 160 parts of water was stirred and boiled under reflux for twelve hours. The free base was salted out by adding sodium chloride and extracting with ether. Upon distillation in vacuum, beta-morpholinoethylaminoethyl vinyl ether.

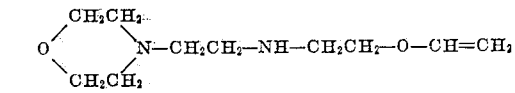

was obtained as a pale yellow liquid boiling at 137–139° C. (10 mm.); $N_D^{25}$ 1.4769.

A mixture of 96 parts of acrylonitrile and 4 parts of beta-morpholinoethylaminoethyl vinyl ether was added gradually to a stirred solution of 500 parts water, 2.6 parts of ammonium persulfate, and 1.3 parts of sodium bisulfite under an atmosphere of nitrogen at 45–50° C. The mixture was maintained for six hours at 50° C., then filtered, washed, and dried. The white powdery copolymer obtained was dissolved in ethylene carbonate to give a 15% solution and spun through a 40 hole spinneret into a bath of polyglycerol at 140° C. The resulting thread was stretched 600% at 120° C., washed, dried, and reheated at 120° C. to give a strong fiber capable of being dyed with acid and basic dyes.

The copolymers of this invention may be prepared by any suitable method, for example, by mass polymerization, emulsion polymerization, etc. It may be advantageous to add various ingredients to the polymerizable mass such as catalysts, emulsifying agents, solvents, etc. Various materials may also be incorporated in the copolymers. For example, plasticizers, lubricants, pigments, etc., may be added either to the polymerizable mixture or to the copolymers to give special properties to the resultant product.

The molecular weights of these polymers and copolymers are preferably within the range of 10,000 to 250,000, or even higher, although polymers having molecular weights between 40,000 and 150,000 may be used with particular advantage in the production of shaped articles. Polymers having a molecular weight of less than 50,000 may be used for such purposes as impregnants, solvent-resistant coatings, etc. The molecular weight of the copolymers is dependent upon the concentrations of monomers, the amount and type of catalyst, the temperature of reaction, etc.

Spinning solutions of the copolymers of this invention may be prepared by heating the finely divided copolymer in the presence of solvents such as the lower alkylene carbonates at temperatures from about 30° C. to about 100° C. In addition, suitable spinning solutions may also be prepared by polymerizing the acrylonitrile-amino-mono-vinyl ether mixture in situ so that the polymer mass remains dissolved in the aforementioned carbonates.

Examples of carbonates suitable for the preparation of these spinning solutions include ethylene carbonate, propylene carbonate, trimethylene carbonate, 1,3-butylene carbonate, etc.

Compositions of this invention are useful in the preparation of shaped articles such as filaments, films, sheets, tubes, etc. These compositions are especially advantageous when shaped articles are produced by wet or by dry spinning. The wet spinning may be accomplished by extruding the polymer solution into hot water baths or into coagulating baths comprising water-soluble, aliphatic, hydroxy-containing compounds including polyhydric alcohols and polyhydric alcohol derivatives such as, for example, ethylene glycol, 2,3-butylene glycol, 1,3-isohexylene glycol, diethylene glycol, triethylene glycol, polyethylene glycol, dipropylene glycol, tripropylene glycol, sorbitol (hexitols), glycerol, polyglycerol, glyceryl mono-ethers such as glyceryl monomethyl ether and glyceryl monoethyl ether, and glyceryl di-ethers such as glyceryl dimethyl ether.

In addition, these alkylene carbonate spinning solutions may in many cases be diluted with a volatile organic liquid such as nitromethane which is a non-solvent for the polymer, without precipitating the polymer. This is often advantageous, particularly for dry spinning.

The dry spinning of the alkylene carbonate solutions of the acrylonitrile-amino-mono-vinyl ether copolymers of this invention can be accomplished by extruding into an evaporative atmosphere, such as a current of heated air. In addition, films and sheets, as well as other molded articles, may be cast from such solutions and the solvent removed by evaporation.

The resulting formed articles, especially fibers, may then be stretched up to 600–1000% or more and thereafter heat treated in the stretched form at temperatures of 100–150° C. These stretched articles, e. g. fibers, exhibit characteristic crystalline X-ray diffraction patterns showing orientation along the fiber axis. This stretching may be accomplished in secondary baths containing materials similar to those suitable for use as the coagulating baths of this invention, or in heated air or nitrogen.

Fibers thus obtained show excellent dyeing properties toward most of the commonly used acid dyes. They are readily dyed, for example, by immersing them for a short time in the hot aqueous bath of the acid dye, containing a small quantity (1–2%) of sulfuric acid or other mineral acids, whereas fibers prepared from polyacrylonitrile itself or from well-known copolymers of acrylonitrile and vinyl chloride, vinyl acetate, vinyl alkyl ethers, vinyl ketones, vinylidene chloride, acrylic acid, methacrylic acid, and their esters or amides, styrene, and butadiene are practically unaffected by acid dyes under the same conditions.

Suitable acid dyes among many others which can be used as described above for dyeing the acrylonitrile-amino-mono-vinyl ether copolymers are, for example, the following:

Fast Acid Green B
Amacid Milling Scarlet 3R
Quinoline Yellow
Wool Orange 3G
Acid Brilliant Red 4BL
Fast Wool Violet 2R
Acid Black 10BN
Brilliant Croceine 3BA
Fast Yellow YA
Indian Yellow GA
Acid Magneta O
Tartrazine C
Acid Violet 4BNS
Naphthol Yellow S
Orange Y
Acid Scarlet 2B
Alizarine Light Blue B The fibers prepared by the practice of this invention are especially advantageous because of their improved dyeing properties, resistance to shrinkage, good heat resistance and tensile strength. Moreover, these properties make the fibers desirable for use in the manufacture of hosiery and for such all-purpose fabrics as are used for blouses, shirts, suits, etc.

I claim:

1. As a new composition of matter, a fiber-forming copolymer derived by the polymerization of a mixture of copolymerizable monoethylenic compounds comprising acrylonitrile and an amino-vinyl ether compound selected from the group consisting of a mono-vinyl ether of an amino-alcohol and a water-soluble salt of a mono-vinyl ether of an amino-alcohol; said mono-vinyl ether having the formula

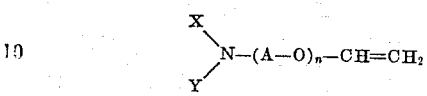

wherein A is an alkylene group, $n$ is an integral number, and X and Y taken singly are members of the group consisting of hydrogen, alkyl, hydroxyalkyl, alkoxyalkyl, aminoalkyl, cyanoalkyl, cycloalkyl, aralkyl, furfuryl, pyridyl, aryl and aminoaryl radicals; and X and Y taken jointly form a saturated heterocyclic radical with the N atom; said acrylonitrile in said mixture comprising at least about 80% of the total monomer weight and said amino-vinyl ether compound in said mixture comprising not more than 10% of the total monomer weight.

2. As a new composition of matter, a fiber-forming copolymer derived by the polymerization of a mixture of copolymerizable monoethylenic compounds comprising acrylonitrile and a water-soluble salt of 2-dimethylaminoethyl vinyl ether; said acrylonitrile in said mixture comprising at least about 90% of the total monomer weight and said amino-vinyl ether compound in said mixture comprising not more than 10% of the total monomer weight; said copolymer having a molecular weight between about 10,000 and 250,000.

3. As a new composition of matter, a fiber-forming copolymer derived by the polymerization of a mixture of copolymerizable monoethylenic compounds comprising acrylonitrile and a water-soluble salt of 2-diethylamino-ethyl vinyl ether; said acrylonitrile in said mixture comprising at least about 90% of the total monomer weight and said amino-vinyl ether compound in said mixture comprising not more than 10% of the total monomer weight; said copolymer having a molecular weight between about 10,000 and 250,000.

4. As a new composition of matter, a fiber-forming copolymer derived by the polymerization of a mixture of copolymerizable monoethylenic compounds comprising acrylonitrile and beta-morpholinoethyl vinyl ether; said acrylonitrile in said mixture comprising at least about 80% of the total monomer weight and said vinyl ether compound in said mixture comprising not more than 10% of the total monomer weight; said copolymer having a molecular weight between about 40,000 and 150,000.

5. A molecularly oriented fiber which exhibits characteristic crystalline X-ray diffraction patterns comprising the copolymer as defined in claim 1.

6. A molecularly oriented fiber which exhibits characteristic crystalline X-ray diffraction patterns comprising the copolymer as defined in claim 4.

7. A molecularly oriented fiber which exhibits characteristic crystalline X-ray diffraction patterns comprising the copolymer as defined in claim 11.

8. As a new composition of matter, a fiber-forming copolymer derived by the polymerization of a mixture of copolymerizable monoethylenic compounds comprising acrylonitrile and a mono-vinyl ether of an amino alcohol; said mono-vinyl ether having the formula

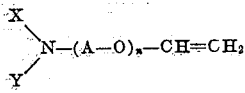

wherein A is an alkylene group, $n$ is an integral number, and X and Y taken singly are members of the group consisting of hydrogen, alkyl, hydroxyalkyl, alkoxyalkyl, aminoalkyl, cyanoalkyl, cycloalkyl, aralkyl, furfuryl, pyridyl, aryl and aminoaryl radicals; and X and Y taken jointly form a saturated heterocyclic radical with the N atom; said acrylonitrile in said mixture comprising at least about 80% of the total monomer weight and said amino-vinyl ether compound in said mixture comprising not more than 10% of the total monomer weight.

9. As a new composition of matter, a fiber-forming copolymer derived by the polymerization of a mixture of copolymerizable monoethylenic compounds comprising acrylonitrile and a water-soluble salt of a mono-vinyl ether of an amino alcohol; said mono-vinyl ether having the formula

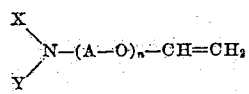

wherein A is an alkylene group, $n$ is an integral number, and X and Y taken singly are members of the group consisting of hydrogen, alkyl, hydroxyalkyl, alkoxyalkyl, aminoalkyl, cyanoalkyl, cycloalkyl, aralkyl, furfuryl, pyridyl, aryl and aminoaryl radicals; and X and Y taken jointly form a saturated heterocyclic radical with the N atom; said acrylonitrile in said mixture comprising at least about 80% of the total monomer weight and said amino-vinyl ether compound in said mixture comprising not more than 10% of the total monomer weight.

10. As a new composition of matter, a fiber-forming copolymer derived by the polymerization of a mixture of copolymerizable monoethylenic compounds comprising acrylonitrile and a water-soluble hydrochloric acid salt of beta-morpholinoethyl vinyl ether; said acrylonitrile in said mixture comprising at least about 90% of the total monomer weight and said amino-vinyl ether compound in said mixture comprising not more than 10% of the total monomer weight; said copolymer having a molecular weight between about 40,000 and 150,000.

11. As a new composition of matter, a fiber-forming copolymer derived by the polymerization of a mixture of copolymerizable monoethylenic compounds comprising acrylonitrile and a water-soluble sulfuric acid salt of beta-morpholinoethyl vinyl ether; said acrylonitrile in said mixture comprising at least about 90% of the total monomer weight and said amino-vinyl ether compound in said mixture comprising not more than 10% of the total monomer weight; said copolymer having a molecular weight between about 40,000 and 150,000.

HERMAN A. BRUSON.

REFERENCES CITED

The following references are of record in the file of this patent:

UNITED STATES PATENTS

| Number | Name | Date |
|---|---|---|
| 2,016,490 | Fikentscher | Oct. 8, 1935 |
| 2,146,295 | Herrmann | Feb. 7, 1939 |
| 2,188,778 | Reppe et al. | Jan. 20, 1940 |
| 2,356,767 | Kropa | Aug. 29, 1944 |
| 2,425,086 | D'Alelio | Aug. 5, 1947 |
| 2,458,352 | D'Alelio | Jan. 4, 1949 |
| 2,491,471 | Arnold | Dec. 20, 1949 |

OTHER REFERENCES

Ser. No. 307,983, Schlack (A. P. C.), published April 27, 1943.